United States Patent
Grinderslev

(10) Patent No.: US 7,775,725 B2
(45) Date of Patent: Aug. 17, 2010

(54) SINGLE-CHANNEL EXPANDED BEAM CONNECTOR

(75) Inventor: Soren Grinderslev, Hummelstown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 1 day.

(21) Appl. No.: 12/260,426

(22) Filed: Oct. 29, 2008

(65) Prior Publication Data
US 2010/0104244 A1   Apr. 29, 2010

(51) Int. Cl.
*G02B 6/38* (2006.01)

(52) U.S. Cl. .............................. 385/74; 385/55; 385/58; 385/60; 385/66; 385/70; 385/78

(58) Field of Classification Search .................. 385/53, 385/55, 58, 60, 66, 70, 73, 74, 76–79, 84
See application file for complete search history.

(56) References Cited

U.S. PATENT DOCUMENTS

| | | | |
|---|---|---|---|
| 4,639,076 A | 1/1987 | Mikolaicyk et al. | |
| 4,781,431 A | 11/1988 | Wesson et al. | |
| 4,889,399 A * | 12/1989 | Mariani et al. | 385/35 |
| 5,459,805 A * | 10/1995 | Foster | 385/74 |
| 6,632,025 B2 | 10/2003 | Ukrainczyk | |
| 6,655,850 B2 | 12/2003 | Mann et al. | |
| 2008/0050073 A1 | 2/2008 | Kadar-Kallen et al. | |

* cited by examiner

*Primary Examiner*—Mark A Robinson
*Assistant Examiner*—Michael P Mooney

(57) ABSTRACT

A single-channel, expanded beam connector having a front and rear orientation and comprising: (a) a housing; (b) an outer sleeve at least partially contained by the housing; (c) a first inner sleeve disposed at least partially in the outer sleeve; (d) a ferrule disposed at least partially in the first inner sleeve; (e) a lens disposed at least partially in the first inner sleeve in front of the ferrule, wherein the lens and the ferrule have about the same outside first diameter which is just slightly less than that of the inside diameter of the first inner sleeve such that the ferrule and the lens are held in optical alignment in the first inner sleeve, and wherein the distal end of the outer sleeve extends beyond the inner sleeve to receive a second inner sleeve of a mating structure, the first and second inner sleeves having the same diameter which is just slightly less than the inside diameter of the outer sleeve such that the first and inner sleeves are aligned within the outer sleeve.

20 Claims, 4 Drawing Sheets

101          102

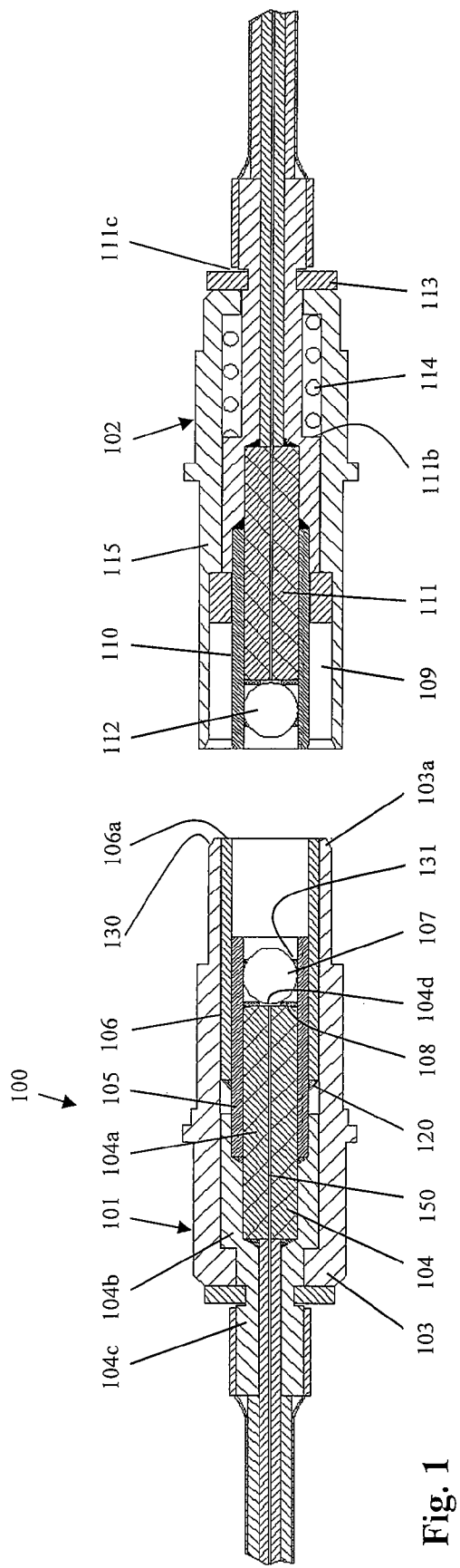
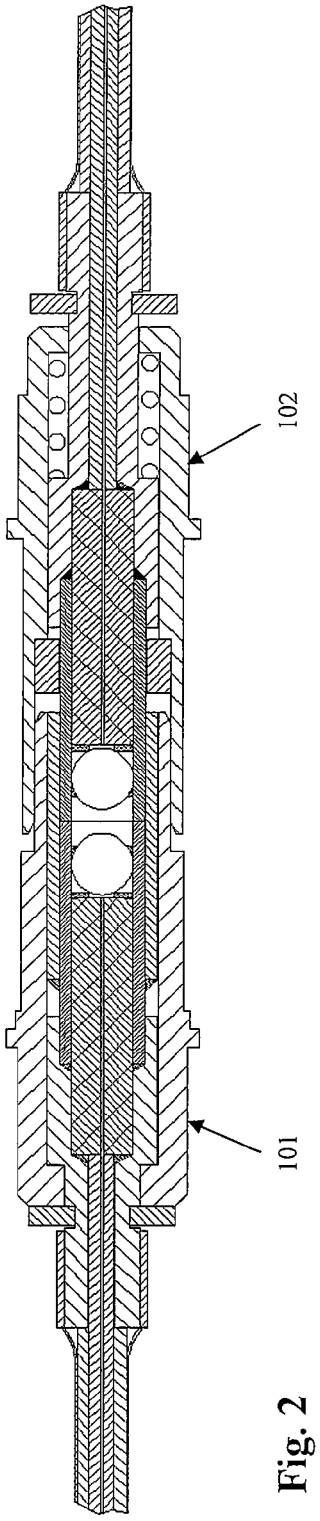
Fig. 1
Fig. 2

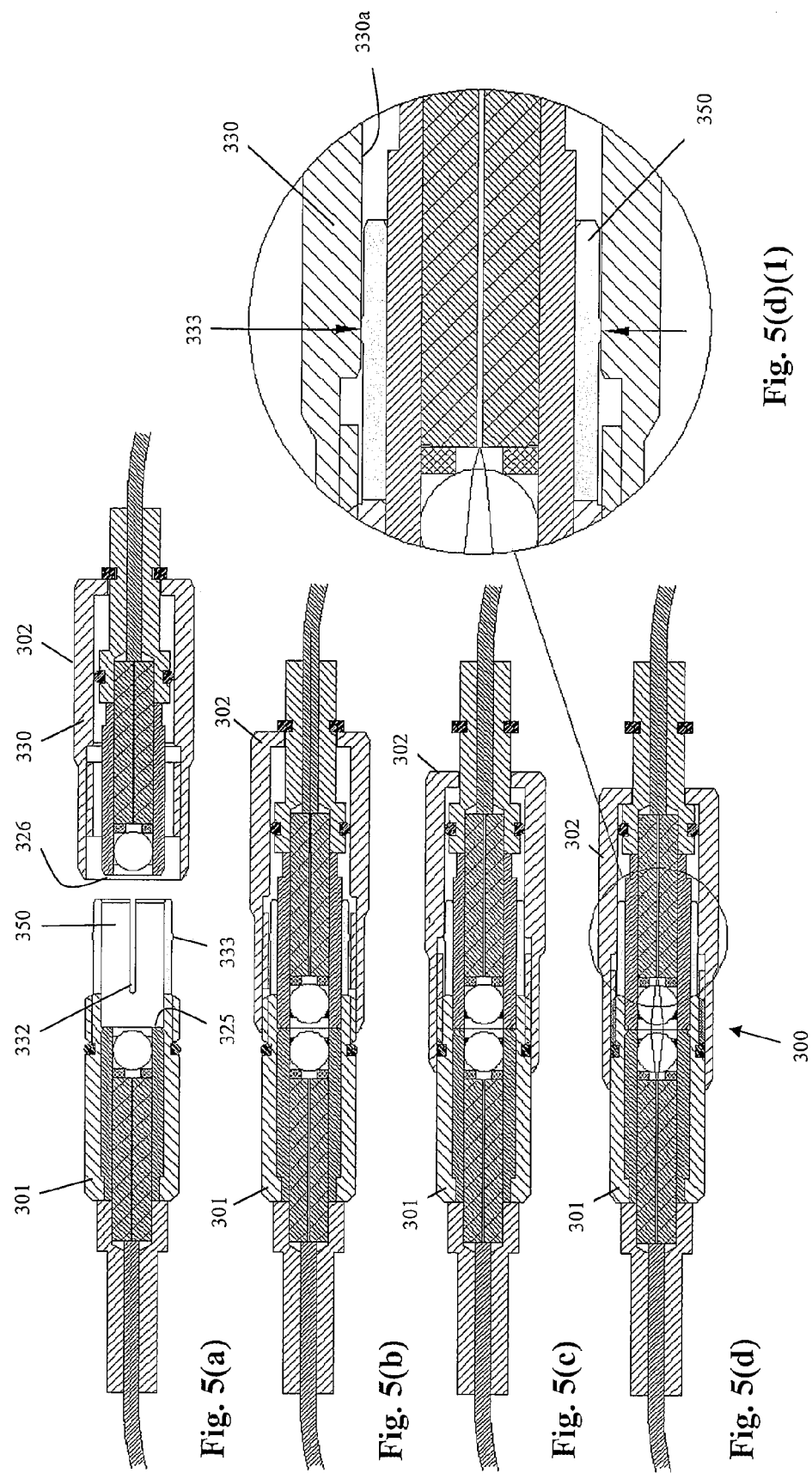

SINGLE-CHANNEL EXPANDED BEAM CONNECTOR

FIELD OF INVENTION

The present invention relates generally to an expanded beam optical connector, and, more specifically, to a single-channel expanded beam optical connector.

BACKGROUND OF INVENTION

Optical fiber connectors are a critical part of essentially all optical fiber communication systems. For instance, such connectors are used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is axially aligned with an optical pathway of the mating structure. This way, light from the fiber is optically coupled to the optical pathway.

Of particular interest herein are "expanded beam" optical connectors. Such connectors are used traditionally in high vibration and/or dirty environments, where "physical contact" between the fiber and the light path of mating connector is problematic. Specifically, in dirty environments, particulates may become trapped between connectors during mating. Such debris has a profoundly detrimental effect on the optical transmission since the particles are relatively large compared to the optical path (e.g., 10 microns diameter in single mode) and are therefore likely to block at least a portion of the optical transmission. Furthermore, in high-vibration environments, optical connectors having ferrules in physical contact tend to experience scratching at their interface. This scratching diminishes the finish of the fiber end face, thereby increasing reflective loss and scattering.

To avoid problems of debris and vibration, a connector has been developed which expands the optical beam and transmits it over an air gap between the connectors. By expanding the beam, its relative size increases with respect to the debris, making it less susceptible to interference. Further, transmitting the beam over an air gap eliminates component-to-component wear, thereby increasing the connector's endurance to vibration. Over the years, the expanded beam connector has evolved into a ruggedized multi-fiber connector comprising an outer housing which is configured to mate with the outer housing of a mating connector, typically through a screw connection. Contained within the outer housing are a number of inner assemblies or "inserts." Each insert comprises an insert housing, a ferrule assembly contained within the insert housing and adapted to receive a fiber, and a ball lens at a mating end of the insert housing optically connected to the fiber. The ball lens serves to expand and collimate light through (or near) the connector interface. When two expanded beam connectors are mated, there is an air gap between the ball lenses of each pair of optically coupled inserts.

One of the most demanding tasks for an expanded bean connector is to maintain the optical alignment between the fiber and the lens. Radial offsets of only a few microns can affect insertion losses significantly. The insert assemblies mentioned above have traditionally performed well in maintaining optical alignment in a given channel using alignment pins and a spring force to maintain contact between the insert interfaces.

Tyco Electronics Corporation (Harrisburg, Pa.) currently offers a line of expanded beam connectors under the brand name PROBEAM®. Although the Tyco expanded beam connector provides a rugged and high performance optical connection, each channel configuration uses the same connector-body footprint (diameter) regardless of the channel count. In other words, regardless of whether the connector has one, two or four optical channels, it is contained in the same housing footprint. Applicant has identified that this configuration limits the ability of the cables of individual channels to branch out independently and thus makes such connectors unsuitable for backplane and similar applications.

Therefore, a need exists for a single-channel expanded beam connector having the optical performance of the multichannel PROBEAM connector. The present invention fulfills this need among others.

SUMMARY OF INVENTION

The present invention provides a single-channel expanded beam connector that exploits the outside dimensions of various optical components to hold and align them in a discrete optical subassembly. Specifically, the present invention recognizes that producing optical components, for example, a ferrule and a lens, with the same outside diameter is readily achievable. These components can then be held in alignment in a compact, cylindrical sleeve to form the subassembly. If the components are designed with good concentricity, it follows that the optical alignment among the components in the cylindrical sleeve is also achieved. The present invention optically couples different optical devices by conveniently aligning the subassembly of each device in a second, common sleeve. Thus, the present invention offers a single-channel connector having a small form factor and a low insertion loss (good optical alignment).

Accordingly, one aspect of the invention is an expanded beam connector in which the optical components are held in alignment in an optical subassembly. In one embodiment, the connector has a front and rear orientation and comprises: (a) a housing; (b) an outer sleeve at least partially contained by the housing; (c) a first inner sleeve disposed at least partially in the outer sleeve; (d) a ferrule disposed at least partially in the first inner sleeve; (e) a lens disposed at least partially in the first inner sleeve in front of the ferrule, wherein the lens and the ferrule have about the same outside first diameter which is just slightly less than that of the inside diameter of the first inner sleeve such that the ferrule and the lens are held in optical alignment in the first inner sleeve, and wherein the distal end of the outer sleeve extends beyond the inner sleeve to receive a second inner sleeve of a mating structure, the first and second inner sleeves having the same diameter which is just slightly less than the inside diameter of the outer sleeve such that the first and inner sleeves are aligned within the outer sleeve. In one embodiment, the outer sleeve comprises compliant portions at its forward end which flex to facilitate receiving the second inner sleeve.

The connector design of the present invention offers a number of important advantages over conventional connectors. For example, by using discrete cables and channels, the connector system allows for branching out of cables in different directions. Furthermore, because the ferrule and lens are contained in a compact, precision sleeve, the connector has a relatively small form factor, especially compared to prior art expanded beam connectors. For example, in one embodiment, a mated pair of the connectors of the present invention has a smaller overall dimension than a mated pair of standard FC connectors. Still another advantage is that the connector system of the present invention does not need an adapter as required by the FC connector. FC connectors are typically mated via an alignment sleeve contained within the adaptor. For the present invention the sleeve is integral to the connector system. Nor does the present invention make use of alignment pins which are typically used for prior art expanded beam systems. The design is also flexible with respect to the optical interface. For example, it allows the ferrule assembly to make use of the glass block concept as disclosed in U.S. Patent Publication No. 20080050073 (hereby incorporated by reference), or the ferrule can have a slant polish in order to reduce the back reflection of a single mode optical signal at the fiber/air interface or be a combination of the glass block concept and a slant polish. Further, similar to the prior art PROBEAM expanded beam system, the single mode version can have physical contact between the fiber and the lens. Still other uses and advantages of the present invention will be apparent to one of skill in the art in light of this disclosure.

BRIEF DESCRIPTION OF DRAWINGS

FIG. 1 shows a connector system of the present invention in the unmated state.

FIG. 2 shows the connector system of FIG. 1 in the mated state.

FIGS. 5(a)-(d) show a sequence of four positions as the connector system of FIG. 3 is mated.

FIG. 5(d)(1) is a blown-up view of a portion of the connector system shown in FIG. 5(d).

DETAILED DESCRIPTION

Figure 3A:
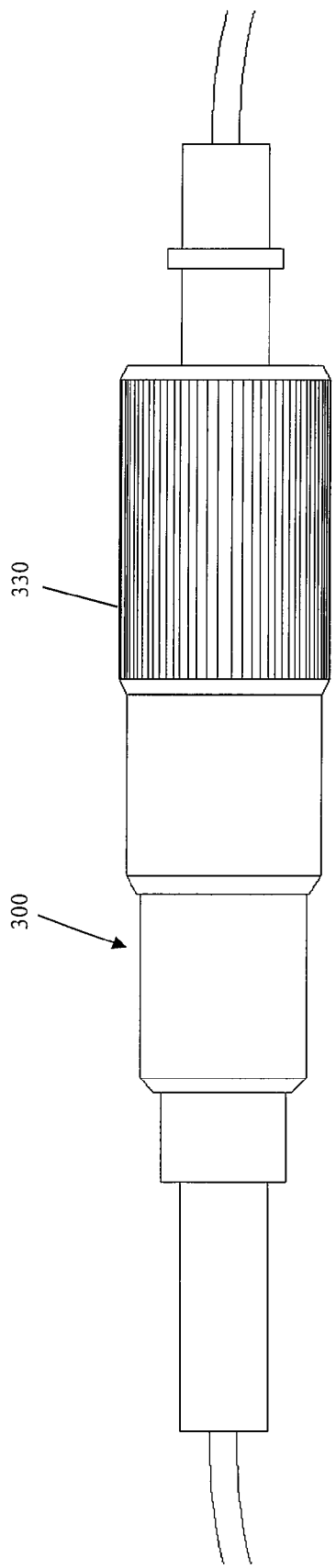
FIG. 3(a) shows side view of another embodiment of the connector system of the present invention.

The present invention provides for an expanded beam connector system to ensure reliable and repeatable optical coupling between the fiber of a connector and the optical pathway (s) of a mating optical structure. The term "optical pathway," as used herein, refers to any medium for conducting optical signals including the following: a fiber or waveguide; a silica-based or polymeric structure in a substrate; or a silica-based or polymeric optical component. The term "mating component" refers to an optical package that contains or comprises the optical pathway. For example, a mating component may be another connector, herein a "mating connector" or it may be an optical device in which the optical pathway is an integral component. Examples of optical devices include passive devices, such as, add/drop filters, arrayed waveguide gratings (AWGs), splitters/couplers, and attenuators, and active devices, such as, optical amplifiers, transmitters, receivers and transceivers.

Referring to FIG. 1, a connector system 100 of the present invention is shown. The system comprises a connector 101 and a mating structure 102. The mating structure 102 depicted in FIG. 1 is a second connector, which does not have an outer sleeve, but does have a spring which is not included in the 101 connector. Although the mating structure is depicted as a connector, it should be understood that other embodiments of the mating structure are possible within the scope of the present invention. For example, the mating structure may also be an adapter, which may be discrete for interfacing the connector of the present invention to another connector, or it may be integrated into a transceiver or other optical device. Still other mating structures as described above are possible.

The connector 101 has a front-and-rear orientation and comprises a housing 103 and an outer sleeve 106 at least partially contained by the housing 103. Within the outer sleeve 106 is an inner sleeve 105, which holds a lens 107 and a ferrule 104. The ferrule 104 holds a fiber 150. The lens and the ferrule have about the same outside diameter, which is just slightly less than the inside diameter of the inner sleeve 105, such that the ferrule and the lens are held in optical alignment in the inner sleeve 105. The combination of the inner sleeve holding a ferrule and lens is referred to herein as an "optical subassembly" or "subassembly." The forward end 106a of the outer sleeve extends beyond the inner sleeve 105 to receive a second inner sleeve 110 of a mating structure 102. The first and second inner sleeves 105, 110 have essentially the same diameter, which is just slightly less than the inside diameter of the outer sleeve 106, such that the first and second inner sleeves are held in optical alignment within the outer sleeve when the connector 101 is mated with the mating structure 102. The elements of connector 101 are discussed in greater detail with respect to not only the embodiment of FIGS. 1-2, but also that of FIG. 3.

The housing of the connector serves to contain the optical components and to physically seat the connector to the mating structure. Referring to FIG. 1, the housing 103 contains the outer sleeve 106 and the inner sleeve 105, which, in turn, contains optical components such as the ferrule 104 and lens 107. The housing 115 of the mating structure 102 also contains a second inner sleeve 110, which contains optical components such as a lens 112 and a ferrule 111.

The housings 103, 115 of the connector 101 and mating structure 102 are configured to connect and interengage. Specifically, referring to FIG. 1, the housing 103 defines a forward edge 103a, and the housing 115 defines an annular recess 109 configured to receive the forward edge 103a when the connector 101 is mated with mating structure 102. The forward edge 103a in this embodiment, includes a tapered tip 130 to provide a lead-in into the recess 109. Once the forward edge 103a is inserted fully within the recess 109, connector 101 is held in a certain position relative to the mating structure 102 as shown in FIG. 2. The embodiment shown in FIGS. 1 and 2 does not have features to keep the connector system locked in a mating position. Rather, this configuration is intended to be used as a "pin/socket" configuration inside a connector housing which provide the mating features. Such configuration can be found, for example, in backplane connectors, Mother/Daughter card connectors, 38999 style connectors or Quadrax type connectors. The particular housings 103, 115 disclosed correspond to the well-known Quadrax size 8 pin and socket contact used in multiple styles of electrical connectors. With this design, different combinations of electrical and fiber optic channels may be used. Furthermore, the house embodiment depicted in FIGS. 1 and 2 is an overmolded version. Furthermore, the housing may be configured to match existing design parameters. Although the housings in FIG. 1 correspond to the Quadrax size 8 pin connector, the subassemblies can be used in any traditional connector design. For example, the subassembly may be inserted or overmolded into an insert body for use as a multi-channel expanded beam connector as described above.

The housing may be formed using known techniques such as injection and overmolding. For example, the housing may be prepared by overmolding the inner sleeve with a polymer, or the housing may be molded separately and then adhered to the inner sleeve. The housing of connector 101 depicted in FIG. 1 is prepared by overmolding, as such the outer sleeve 106 is secured to the housing. Mating Structure 102 is assembled of various components which have been either molded and machined.

The function of the inner sleeves is to hold and align the optical components, which in this embodiment, are the ferrule and lens, although the optical components may also include a glass block (as disclosed in U.S. Patent Publication No. 20080050073), or be held in physical contact with each other via a spring or use of optical gel as an index matching coupling medium. In the preferred embodiment, the optical components have approximately the same outer diameter such that the cylindrical inner sleeve holds them in optical alignment. Specifically, referring to FIG. 1, the inner sleeve 105 is configured to hold a portion 104a of ferrule 104 and lens 107. Because these components have approximately the same outer diameter, they are held in alignment within the sleeve 105. Likewise, the inner sleeve 110 of the mating structure 102 contains the front part of a ferrule 111 and a lens 112, and holds them in alignment.

Because the inner sleeves serves to hold the lens and ferrule in optical alignment, the difference between the outside diameter of the ferrule and lens and the inside diameter of the inner sleeve should be no greater than the maximum allowable radial offset between the optical axes of the ferrule and lens. Generally, this is no more than about 4 μm (Multi mode fiber system), and preferably no more than about 3 μm, and even more preferably no more than about 2 μm (Single mode fiber system).

Connector system 100 has an air gap between the lens and the front face 104d of the ferrule 104. To create this air gap, an annular spacer 108 is placed between the lens and the ferrule. The annular spacer 108 has a predetermined thickness to ensure that the distance between the edge of the lens 107 and the front face of the ferrule 104d along the optical axis equals the focal length of the lens such that the fiber end face is positioned at the focal distance from the lens. The focal distance of the lens is partially a function of the lens material and may, for certain materials, cause the focal point to be positioned close to the lens surface. In such cases the fiber needs to make contact with the lens. Such a determination is readily performed by one of skill in art.

Mating structure 102 has the same configuration with respect to the ferrule and lens in the inner sleeve 110.

The inner sleeve is preferably formed from a precision material such as a metal (e.g., phosphor-bronze) or a ceramic. Preferably, the inner sleeve is a simple cylinder for ease of manufacturing and assembly.

There are several ways in which the optical subcomponents can be assembled within the inner sleeve. Generally, it is preferable for the ferrule and lens to be secured in the inner sleeve to resist movement. For example, one method is to position the lens and the ferrule in the tube with an interference fit. This gives the best alignment and also the best stability in optical performance when exposed to thermal extremes. Another possibility is to allow a very small assembly clearance and then fix the components in place with epoxy. This will allow active optical positioning and monitoring during the epoxy cure period. Finally, a combination of interference and epoxy fixation may be used.

With respect to the interference fit, the assembly method may involve first heating the inner tube in a fixture with the lens positioned underneath the sleeve. At a certain temperature, the inner sleeve will expand and allow the lens to enter. At this point, the annular spacer is inserted or disposed in the sleeve such that it rests on the internal lens surface. Next, a ferrule terminated with an optical fiber is inserted at the open end of the inner sleeve until it stops against the annular spacer. At this point, the assembly is allowed to cool down to create an optical assembly with an interference fit. To further secure the lens to the inner sleeve, epoxy 131 may be applied to the edge of the lens as shown in FIG. 1.

The outer sleeve functions to align the inner sleeves 105, 110. To this end, the outer sleeve receives both inner sleeves and its inside diameter is toleranced very closely to the outside diameter of the inner sleeves such that the inner sleeves are held in close alignment to one another. To this end, the outside diameter of the inner sleeves should be just slightly less than the inside diameter of the outer sleeve such that the optical components (i.e., the ferrules and lenses) in the inner sleeves are held in optical alignment. Accordingly, the difference between the outside diameter of the inner sleeve and the inside diameter of the outer sleeve should be no greater than the maximum allowable radial offset between the optical axes of the lens. As mentioned above, this is no more than about 4 μm (multi mode fiber system), and preferably no more than about 3 μm, and even more preferably no more than about 2 μm (single mode fiber system).

Referring to FIG. 1, the outer sleeve 106 is contained within housing 103. In this embodiment, the outer sleeve is totally contained within the housing, which is preferable form a protection standpoint, although other embodiments may have the outer sleeve extending from the housing. Adhesive 120 is used to secure the outer sleeve 106 to the inner sleeve 105. Although the outer sleeve 106 is shown associated with the connector 101, it should be understood that the outer sleeve 106 could be, instead, attached to the mating structure 102 such that, during mating, the outer sleeve 106 would receive the inner sleeve 105, rather than receiving the inner sleeve 110.

As shown in FIG. 1, the outer sleeve 106 is a discrete component from the housing 103. Such a configuration allows the outer sleeve to be manufactured separately from the housing, thus facilitating the use of precision manufacturing techniques that may be superfluous for other portions of the housing 103. Nevertheless, in certain embodiments, it may be preferable for the outer sleeve 106 to be integral with the housing 103. (Such an embodiment is discussed with respect to FIG. 3.) In yet other embodiments, the outer sleeve 106 may be integrated with one of the inner sleeves 105. Specifically, to the extent that the outer sleeve 106 is fixed in position relative to an inner sleeve 105, 110, it may be integral, integrally molded, formed or otherwise secured to the inner sleeve.

As mentioned above, it is critical that there is a low tolerance fit between the outer diameter of the inner sleeves and the inner diameter of the outer sleeve such that the inner sleeves are held in alignment within the outer sleeve. Although minimal tolerance is desired, it is generally recognized that if the tolerance is too tight, the ability of the inner sleeve to slide within the outer sleeve during mating may be compromised. Specifically, if the inner diameter of the outer sleeve 106 is not sufficient, then the inner sleeve may bind with it during the mating process. This binding may make mating the components prohibitively difficult, or even damage the inner and outer sleeves during the mating process.

There are different ways to avoid binding the outer and inner sleeves. One way is to pre-align the sleeves prior to the outer sleeve receiving the inner sleeve. Specifically, connector system 100, as mentioned above, prealigns the inner sleeve 110 with the outer sleeve 106 when the forward edge 103a of the housing 103 is received in the annular recess 109.

Figure 4:
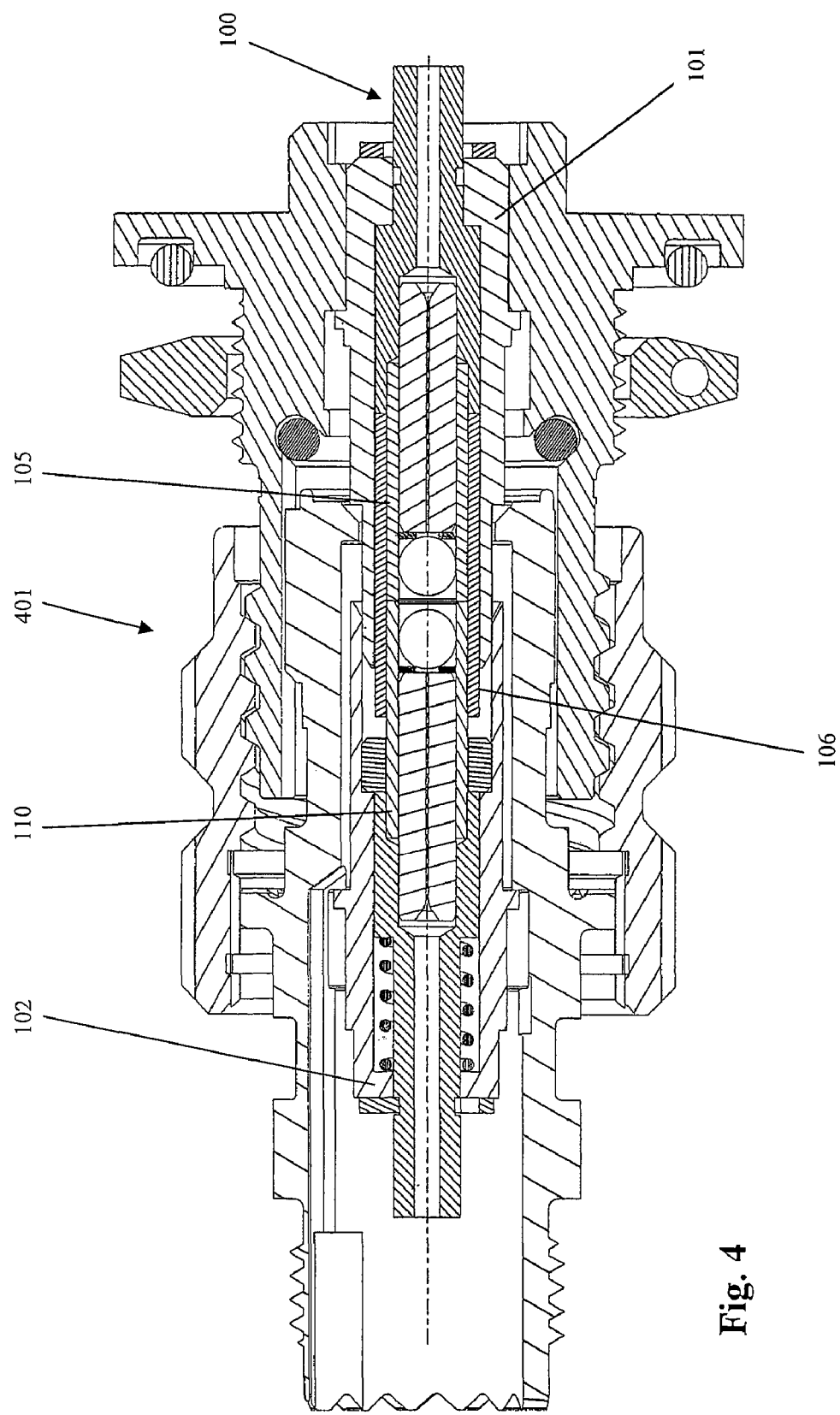
FIG. 4 shows the connector system of FIG. 1 in an outer housing.

Additionally, in one embodiment, an outer housing is also used to effect and maintain alignment. Specifically, referring to FIG. 4, the connector system 100 is disposed in an outer housing 401. The outer housing 401 in this embodiment is a well-known 38999 Size 9 Plug and Receptacle, which is a ruggedized connector typically used for electrical connectors. The outer housing provides a rigid structure that serves to align and secure the connector system 100 during mating. As mentioned above, the compact design of the subassembly allows it to be used with traditional connectors systems such as backplane connectors, Mother/Daughter card connectors, 38999 style connectors or Quadrax type connectors.

Another way to prevent binding is to impart compliance to either the inner or outer sleeve to flex when mating. In one embodiment, the outer sleeve comprises one or more compliant portions to receive the inner sleeve. These compliant portions can be provided in different ways including, for example, using resilient materials or creating flexible beams. Referring to FIGS. 3 and 5, a connector system 300 having an outer sleeve 306 with compliant portions 350 is shown. Specifically, the outer sleeve defines one or more channels 332 that run from its forward end 306a rearwardly to define compliant portions 350 (see also FIG. 5(a)). The compliant portions 350 allow the outer sleeve 306 to receive the inner sleeve 310 without binding by spreading apart to accommodate misalignment between the sleeves. The compliant portions 350 will guide the inner sleeve 310 into alignment with first inner sleeve 305 once the inner sleeve 310 passes the rearward end of the compliant portions.

In one embodiment, the outer sleeve comprises means to reduce the tolerance between the inner and outer sleeve once the inner sleeve 310 is inserted in the outer sleeve 306. Although different means can be used to achieve this configuration, in this embodiment, a protrusion 333 extends outwardly and radially from the outer sleeve 306 as shown. The protrusion 333 serves to urge the compliant portions 350 inwardly as a radial force is applied to it. To this end, the connector 301 and mating structure 302 have a mechanism to apply inward radial force on the protrusion 333. In this embodiment, the mechanism is a cam or similar mechanism activated by nut/thread interengagement. More specifically, the housing of the mating structure 302 comprises a nut 330 and the connector 301 comprises threads 331 which are configured to interengage the threads of the nut 330. As the nut 330 is turned and the threads interengage, the nut 330 moves toward the connector 301 and its inner surface 330a contacts the protrusion 333 causing it to move inwardly thereby urging the compliant portions 350 inward such that they contact the inner sleeve 310 to thereby hold it in alignment with inner sleeve 305.

Referring to FIGS. 5(a) through (d), the mating of connector system 300 is shown step by step. As the connector 301 is brought in contact with the mating structure 302 as shown in FIG. 5(a), the forward edge 306a is received in the annular recess of 309 as shown in FIG. 5(b). The inner sleeve 310 of the mating connector 302 slides into the outer sleeve 306 until the mating faces 325, 326 of inner sleeves 305 and 310 contact each other as shown in FIG. 5(b). Next, as shown in FIG. 5(c) the nut 330 is threaded onto the threads 331 of connector 301 to urge mating structure or 302 and connector 301 together by pushing on the back of the ferrule base to ensure contact between the mating faces 325, 326 of the inner sleeves is maintained, and a proper axial distance is maintained between the lenses 307, 312. Furthermore, as mentioned above and shown in FIG. 5(d) and blowup FIG. 5(d)(1), while the nut 330 is being tightened, it not only applies a forward mating force between the two inner sleeves, but also forces compliant portions 350 inward forcing them to clamp down on the inner sleeve 310 by virtue of the inner surface 330a of the nut urging against the protrusion 333

Although optical connector systems 100 and 300 are alike with respect to the inner and outer sleeves, they differ in a number of significant ways. Specifically, unlike connector system 100 in which the outer sleeve 106 is a discrete component contained within the housing, in connector system 300, the outer sleeve 306 is integral with the housing of connector 301. Specifically, the outer sleeve 306 is exposed and is connected with the inner sleeve 305 through an annular ridge 335.

Whether the outer sleeve is discrete or integral to the housing depends on the application and desired features. For example, the connector system 100 shown in FIGS. 1 and 2 has a slight advantage with respect to manufacturability because the outer sleeve can be produced independent of the housing, thereby allowing the use of high-precision manufacturing techniques that may be unnecessary for the housing. For example, the outer sleeve may be manufactured from metal or ceramic materials while the housing may be injection molded. Additionally, with the connector system 100, the housing 103 covers and protects the outer sleeve 106, and, thus, the outer sleeve may be designed more for precision than for strength and manufacturability.

On the other hand, the connector system 300 is a self-contained system, and the outer sleeve functions not only as an alignment member, but also as an integral part of the housing, thereby reducing the number of parts required. Additionally, because the outer sleeve is part of the housing, it may be formed during the overmolding process along with the housing. This may reduce costs.

Referring back to FIG. 3 additional components of the connector system 300 are described. The lens 107 functions, in one respect, to expand and collimate a relatively narrow optical beam emitted from a fiber into a relatively large beam for transmission through an air gap. The collimated beam is received by a similar lens 312 which focuses the beam onto the end face of the receiving fiber of the mating structure. Suitable lens include, for example, a ball lens, a GRIN lens, or a lens or lens assembly containing spherical or aspherical surfaces with uniform or graded index lenses. In one embodiment, the lens 107 is a ball lens coated with an antireflective (AR) material for an air/glass interface. The coating may be applied only at the region that the light path passes through the lens, or it may be applied uniformly around the ball lens for simplicity and ease of manufacture (i.e., no need to align the lens in the housing).

The ferrule 04 serves to secure and align an optical fiber 150. To this end, ferrule assembly 104 comprises a ferrule front portion 104a which is received in the inner sleeve 105, and a metal collar portion 104b, which has a larger diameter than the front portion 104a. The collar portion 104b shoulders against the housing 103 to prevent the rearward movement of the ferrule assembly 104. The ferrule assembly 104 also comprises a rear portion 104c, which exits the housing 103 and may contain a groove for receiving a clip as discussed with respect to ferrule 111. In addition, the rear portion 104c may also be used for anchoring the cable strength members via a crimp sleeve. An advantage of the present invention is that the end face 104d of the ferrule can be prepared (i.e., polished) prior to the ferrule's installation into the inner sleeve 105. This allows the end face 104d to be configured with any known end face geometry using known techniques and apparatus. For example, the end face 104d (and the corresponding end face in the mating structure) may be polished to have a flat or curved end face or an APC end face.

Referring to the mating structure 102, the ferrule 111 is essentially the same as disclosed with respect to connector 101, however, in this embodiment, the ferrule 111 is urged forward by a spring 114. Specifically, spring 114 is disposed between a back surface of the collar 111b and the housing 115 to thereby urge the ferrule 111 forward. Additionally, in this particular embodiment, the rear portion of the collar 111c comprises a groove around which a clip 113 is snapped in place. The clip 113 limits the forward motion of the ferrule 111 with respect to the housing 115.

It is worthwhile to note that, in this embodiment, connector 101 does not have a biased ferrule while the mating structure of 102 does have biased ferrule. Such a configuration recognizes that one biased ferrule is generally sufficient to maintain a contacting force between inner sleeve 105 and inner sleeve 110. The embodiment of FIG. 3 is slightly different in that neither ferrule is forwardly biased. The need for a forwardly biased ferrule in the embodiment of FIG. 3 is diminished because of the locking nut 330 which necessarily holds the inner sleeves together.

Figure 3B:
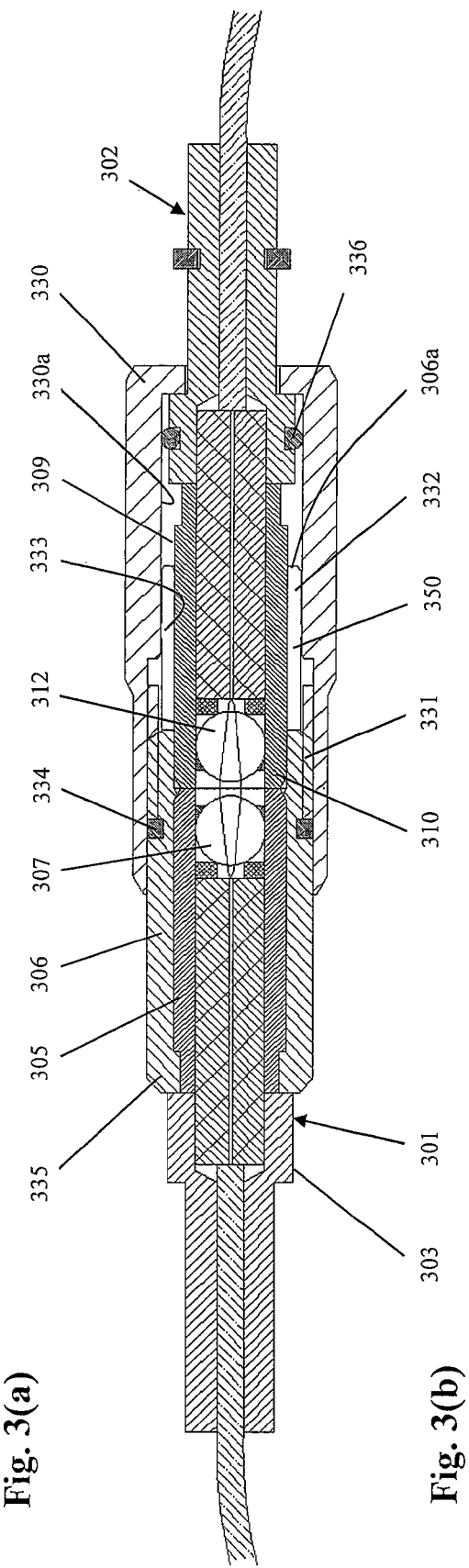
FIG. 3(b) shows a cross section of the connectors of FIG. 3(a).

Referring to FIG. 3b, in one embodiment, the connector comprises a series of O-rings 334 and 336. These O-rings are positioned to prevent dust, debris and moisture from interfering with the optical coupling between the lens 307, 312. Specifically, O-ring 334 is positioned such that when nut 330 is inter-engaged with threads 331, the nut 330 slides over O-ring 334, therefore forming a barrier between the first connector 301 and mating structure 302. Likewise, O-ring 336 is positioned near the back of the nut 330 and prevents dirt, debris and moisture from entering from the rear side of nut 330 and interfering with the optical coupling.

What is claimed is:

1. An optical connector having a front and rear orientation and comprising:
   a housing;
   an outer sleeve at least partially contained by said housing;
   a first inner sleeve having an inside diameter and disposed at least partially in said outer sleeve;
   a ferrule having a first outside diameter just slightly less than said inside diameter and disposed at least partially in said first inner sleeve such that said ferrule is axially aligned in said inner sleeve;
   a lens having a second outside diameter about the same as said first outside diameter and disposed at least partially in said first inner sleeve in front of said ferrule such that said lens is axially aligned in said inner sleeve independent of said ferrule, thus
   said ferrule and said lens are held in optical alignment by said first inner sleeve; and
   wherein a forward end of said outer sleeve extends beyond said first inner sleeve to receive a second inner sleeve of a mating structure, said first and second inner sleeves having the same diameter which is just slightly less than the inside diameter of said outer sleeve such that said first and second inner sleeves are aligned within said outer sleeve.

2. The optical connector of claim 1, further comprising said mating structure.

3. The optical connector of claim 2, wherein said mating structure is a second connector.

4. The optical connector of claim 2, wherein said outer sleeve is discrete from said housing.

5. The optical connector of claim 2, wherein said outer sleeve defines one or more channels extending backward from its forward end, thereby defining one or more compliant portions of said outer sleeve.

6. The optical connector of claim 5, wherein said compliant portions comprise one or more protrusions which extend radially outward, said protrusions contacting a component of said mating structure during mating such that said compliant portions are urged radially inward, thereby urging against said second inner sleeve to ensure alignment with said first inner sleeve.

7. The optical connector of claim 6, wherein said component is a nut, and wherein said housing has threads to facilitate screwing said nut thereon to secure said mating structure to said connector and to urge said nut against said protrusions to urge said compliant portions into said second inner sleeve.

8. The optical connector of claim 2, wherein said housing comprises an annular forward edge to be received in an annular recess of a second housing of said mating structure containing said second inner sleeve.

9. The optical connector of claim 8, wherein said annular forward edge extends beyond said forward end of said outer sleeve.

10. The optical connector of claim 9, wherein said mating structure has a forward and rear orientation and comprises an annular forward edge that is configured to encircle and hold said annular forward edge of said first connector.

11. The optical connector of claim 10, wherein the distance from said forward edge to said forward end is such that said forward edge is received in said annular recess before said second inner sleeve is received in said outer sleeve thereby providing pre-alignment of said second inner sleeve in said outer sleeve during the mating process.

12. The optical connector of claim 1, wherein said mating structure is a second connector and comprises a second ferrule disposed within said second inner sleeve, and a spring for biasing said second ferrule forward.

13. The optical connector of claim 1, wherein said ferrule is held in a fixed position in said connector.

14. The optical connector of claim 13, wherein said ferrule comprises a collar portion and a more narrow forward portion, wherein said forward portion is received at least partially in said first inner sleeve.

15. The optical connector of claim 2, further comprising an annular spacer between said ferrule and said lens to create an air gap therebetween and to position the ferrule end face at the focal distance of the lens.

16. The optical connector of claim 1, wherein said ferrule and said lens form an interference fit with said first inner sleeve when disposed therein.

17. The optical connector of claim 1, wherein said ferrule and said lens are secured in said first inner sleeve with adhesive.

18. The optical connector of claim 1, wherein said first inner sleeve has a mating face for contacting said second inner sleeve, and said lens is a certain distance from said mating face such that said lens is a certain distance from said second inner sleeve when said connector is mated with said mating structure.

19. The optical connector of claim 1, wherein said lens is a ball lens.

20. The optical connector of claim 1, wherein said lens is multimode fiber in a ferrule.

* * * * *